July 12, 1966  B. A. COLES  3,260,926
MAGNETIC FIELD MEASUREMENT METHOD AND APPARATUS
Filed June 3, 1963
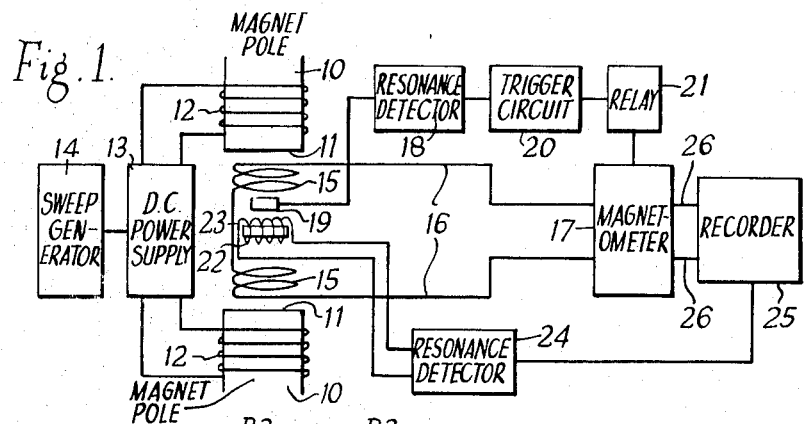
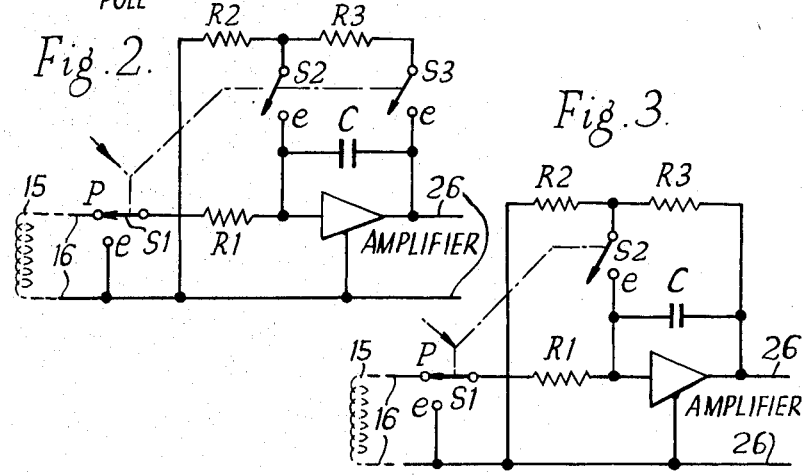
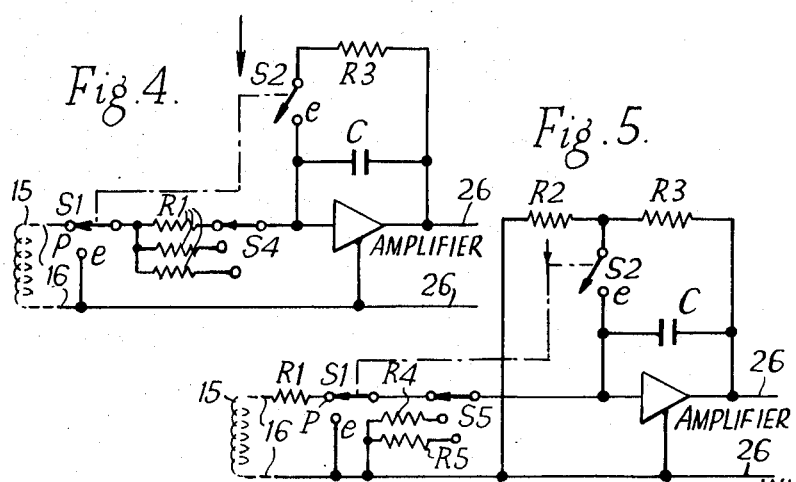
INVENTOR
BARRY ARCLAY COLES
BY
Irwin S. Thompson
ATTORNEY United States Patent Office 3,260,926
Patented July 12, 1966

3,260,926
MAGNETIC FIELD MEASUREMENT METHOD
AND APPARATUS
Barry A. Coles, 16 Bradmore Road, Oxford, England
Filed June 3, 1963, Ser. No. 284,990
Claims priority, application Great Britain, June 5, 1962,
21,745/62
13 Claims. (Cl. 324—.5)

This invention relates to the measurement of varying magnetic fields. It is particularly, although by no means exclusively, adapted to the measurement of the magnetic field in magnetic resonance experiments or in experiments where a magnetic field is used to deflect a beam of charged particles.

It is already known that the output obtained from a probe coil placed in a varying magnetic field can be integrated by means of an integrating circuit to produce a voltage which is directly related to the field and in connection with rapidly changing or pulsed magnetic fields use has already been made of an integrating circuit comprising a D.C. amplifier having feedback through a capacitor and producing a 180° change of phase.

It is an object of the invention to provide an improved method of and apparatus for measuring the changing values of a varying magnetic field including one whose rate of change is slow, for example, of the order of 2 gauss per minute or even less.

Apparatus in accordance with the invention for measuring the variation in value of a changing magnetic field with respect to a predetermined datum field value comprises an integrating circuit, a coil winding for location in the magnetic field, and signal controlled switch means which are operable in a first position to hold said integrating circuit output at zero, and in a second position to apply the voltage induced in said coil winding to the input of said integrating circuit and simultaneously to release said integrating circuit from its previous zero-held state.

The integrating circuit preferably comprises a high gain, phase-reversing D.C. amplifier having a series-connected input resistor and a feedback capacitor between output and input.

In a particular form of the invention, the switch means is arranged to be operated automatically by nuclear resonance detecting means having a detector member located in said magnetic field whereby the change-over of said switch means from its first position to its second position may be made precisely coincident with the arrival of the varying field at a known value which thereafter constitutes the datum field value.

In order that the invention may be more readily understood, several embodiments thereof and their manner of operation will now be described in detail by way of illustrative example and with reference to the accompanying drawings, wherein like elements have the same references and in which:

FIG. 1 is a diagram, largely in block schematic form, of an apparatus arrangement for investigating nuclear magnetic resonance phenomena and embodying means for effecting measurement of a varying magnetic field according to the invention; and FIGS. 2–5 are circuit diagrams of four embodiments of integrating magnetometer suitable for use with the apparatus arrangement according to FIG. 1.

Referring first to FIG. 1, the apparatus arrangement shown comprises an electromagnet 10 having two opposed pole faces 11, which magnet has coil windings 12 arranged to be energised by means of a power supply 13. The magnetic field of the magnet 10 between the pole faces 11 is arranged to be variable and to be swept slowly through a required range of different field intensities by means of a sweep generator 14 associated with the power supply 13. The sweep generator 14 is preferably a completely flexible electronic sweep generator, which is able to provide a continuous uninterrupted sweep from a chosen maximum field value to zero field or even through zero to maximum reversed field.

A probe coil 15 consisting of one or more wire turns enclosing an area A is located in the flux gap between the pole faces 11 and this coil winding is connected by leads 16 to a magnetometer 17 whose form will be described in detail later. Also located in the gap between the pole faces 11 is a detector head 19 of a nuclear magnetic resonance or electron spin resonance device whose associated control and other circuits are shown at 18. In a preferred embodiment such detector consists of the head unit of a proton resonance oscillator and comprises an oscillator and probe having built-in modulation coils. The circuits 18 are associated with a trigger circuit 20 which is arranged to be set on by the application thereto of a signal pulse developed in the resonance device 18 when the magnetic field between the pole faces 11 is at a precisely known value. When in its "on" state, this trigger circuit 20 is arranged to actuate a relay 21 which performs certain switching operations in magnetometer 17 to cause it to begin integration of the voltage induced in the probe coil winding 15.

The arrangement shown in FIG. 1 also includes a coil winding 22 surrounding a sample 23 of a material under investigation and which exhibits the phenomenon of magnetic resonance when located in the magnetic field. The coil 22 is connected to its associated resonance detecting equipment 24 and the signal output from the latter is fed to the input terminals associated with one display axis of a graphical type recorder 25. The recorder 25 also receives signals by leads 26 from the magnetometer 17.

Reference is now made to FIG. 2, which shows a circuit diagram of one embodiment of the magnetometer 17. The coil winding 15 is connected by way of a switch S1, when in position $p$, and a series input resistor R1 across the input terminals of a high gain, D.C. amplifier A whose signal output on leads 26 is of opposite polarity to that of the input on leads 16.

A feedback capacitor C is connected between the output and input of the amplifier whereby the arrangement is effectively a Miller type integrator circuit. By means of switches S2 and S3, when in position $e$, a first resistor R2 may be connected across the amplifier input and a second resistor R3 shunted across the capacitor C. The switch S1 is of the change-over type whereby, when in the opposite position $e$, the probe coil 15 is disconnected and the input resistor R1 is shunted across the amplifier input. Such switches S1, S2 and S3 are, in this embodiment, constituted by contacts of the relay 21, the switches being in the position $p$ when the relay is operated and in the position $e$ when it is released.

With the switches S1, S2 and S3 in the positions $p$ as shown, any change in the field experienced by the probe coil 15 by an amount $dH$ will result in an alteration of the output voltage of the amplifier by an amount $dV$ where $$dV = \frac{A.dH}{10^8.R.C.}$$

when $A=$ the area in cm.² subtended by the probe coil 15 perpendicular to the field,
$V=$ output voltage of the amplifier A in volts,
$H=$ the field strength in oersteds,
$R=$ resistance of the series input resistor R1 in ohms, and
$C=$ capacitance of the capacitor C in farads.

When the switches S2 and S3 are closed in position *e*, the output voltage V of the amplifier A is reduced to zero.

In one manner of operation of the arrangement, the probe coil 15 is placed in the magnetic field which is caused to be increasing or descreasing slowly with the switches S1, S2 and S3 in the position *e* to make the amplifier output voltage zero.

At the instant when the changing field reaches the predetermined initial value as determined by the resonance device of detector head 19 and circuits 18 (FIG. 1), the trigger circuit 20 is set on and the relay 21 operated. The switches S2 and S3 are accordingly opened and switch S1 is simultaneously changed to position *p* to connect the probe coil 15 to the amplifier input. Thereafter the output voltage V of the amplifier is accurately related to the difference *d*H between the actual field value at any instant and the precisely known initial field value at the instant of switch change-over. The value of the magnetic field at any subsequent instant, e.g. when a phenomenon occurs in the magnetic resonance sample 23 (FIG. 1), may then be determined by measuring the output voltage V, converting it to the corresponding change of field *d*H by use of the relation, $dH = 10^8 \cdot V.R.C./A.$, and then adding the field change value *d*H thus obtained to the precisely known starting or datum value with due regard to sign.

FIG. 3 shows a modified form of the circuit of FIG. 2. The switch S3 is omitted, since by the choice of suitable values for the first and second resistors R2 and R3 and by using a high quality switch for S2 it is possible to keep the first and second resistors R2 and R3 permanently connected across the amplifier output.

A further modification is illustrated in FIG. 4 where the first resistor R2 (FIG. 2) is omitted and the series-connected input resistor R1 is used to serve the same function as said first resistor. For convenience, a further manually operable switch S4 is connected between the input resistor R1 and the amplifier A to permit selection of alternative values of such input resistor.

FIG. 5 shows yet another form of magnetometer circuit. In this embodiment the input resistor R1 is located between the switch S1 and the probe coil 15 and the first resistor R2 is again included. In addition, a manually operable switch S5 is included to allow either the connection of the switch S1 across the amplifier input or the connection of further resistors R4 or R5 across the amplifier input. These resistances R4, R5 are of a low value and are provided so that the drift rate of the amplifier can more readily be set to zero. A low value resistance shunted across the amplifier input will give rise to a high drift rate and this facilitates adjustment of the amplifier balance control.

In a preferred embodiment such as is illustrated in FIG. 5, typical experimentally determined impedance values are;

| | |
|---|---|
| Resistor R2 | 100 KΩ. |
| Resistor R3 | 1 MΩ. |
| Resistor R4 | 1 KΩ. |
| Resistor R5 | 200 Ω. |
| Capacitor C | 1 microfarad. |

If the phenomenon under investigation is of a form capable of being indicated as a varying voltage or current, it may be convenient to provide a continuous display of the phenomenon as a function of the field upon an oscilloscope or other form of *x–y* display or on the recording device 25 by supplying the amplifier output voltage to the deflection means for, say, the *x* axis and by supplying the voltage or current signals representing the phenomenon from the nuclear magnetic or electron spin resonance equipment 24 to the deflection means for the, say, *y* axis. The resultant produced chart will then show the resonance lines plotted against field value, so that line positions and widths may be read directly.

Alternatively, the amplifier output voltage may be supplied to an accurate voltmeter or digital voltmeter.

The predetermined datum value of the magnetic field at which operation of the switch means is effected includes that of zero magnetic field. The amplifier output voltage V when a field is subsequently applied will be related to the actual value of that field by the relation, $$H = 10^8 \cdot V.R.C./A.$$

One convenient apparatus arrangement for controlling the switch operation automatically upon arrival of the changing magnetic field at zero value is to employ as the detector element within the field, that known in the nuclear engineering art as a peaking strip. Such peaking strip device comprises a strip of magnetic material having a rectangular form hysteresis characteristic encircled by a coil winding and disposed parallel with the field. The sudden change of the magnetisation direction in the strip as the field reverses induces a current in the winding, which current may be amplified and employed as a trip or trigger medium to operate the relay forming the switch means. Such arrangement changes over at a field value slightly displaced from time zero owing to the hysteresis of the strip material but this may be corrected in a manner already known by the provision of an extra winding supplied with a suitable bias current.

I claim:

1. Apparatus for generating a fluctuating magnetic field and measuring the value thereof comprising an electromagnet having two opposed pole faces and an energising coil, means to generate a variable voltage and apply said voltage to said energising coil, an integrating circuit comprising a high gain, phase reversing, D.C. amplifier having two output terminals and two input terminals, the output terminals and a first input terminal of said amplifier forming respectively the output terminals and a first input terminal of the integrating circuit, a capacitor electrically connected between the second input terminal and one of the output terminals of the amplifier, a first resistor electrically connected at one end to the second input terminal of the amplifier, a second input terminal for the integrating circuit electrically connected to the other end of said resistor, a coil winding for location in the magnetic field, a first end of said coil winding being electrically connected to the first input terminal of the integrating circuit, first signal operated switch means operable in a first position to electrically connect the second input terminal of the integrating circuit to the first input terminal thereof and to the second end of the coil winding in a second position, a second resistor, second signal operated switch means arranged for simultaneous operation with said first switch means, operable in a first position to connect said second resistor in parallel with said capacitor and in a second position to break said parallel connection, detecting means arranged to detect and indicate when the field strength of the magnetic field reaches a predetermined value, means responsive to the indication from said detecting means to provide an operating signal for each of said switch means to cause it to change from its first position to its second position, and indicating means electrically connected to the output terminals of the integrating circuit to indicate the magnitude of the output therefrom.

2. Apparatus according to claim 1 in which said first and second signal operated switch means comprise a relay, having first and second switch contacts forming said first and second switch means and a trigger circuit responsive to the indication from said detecting means and whose output provides energising current for said relay.

3. Apparatus according to claim 1 which comprises a third resistor having low-electrical resistance and third switch means interposed between said first switch means and the second input terminal of said amplifier, said third switch means being operable to electrically correct said input terminal to said first switch means in a first position and to said third resistor in a second position.

4. Apparatus according to claim 1 which comprises a plurality of further resistors having low electrical resistance and third switch means interposed between said first switch means and the second input terminal of said amplifier, said third switch means being operable to electrically connect said input terminal to said first switch means in a first position and to one of said plurality of further resistors in each of a like plurality of alternative positions.

5. Apparatus for studying magnetic resonance phenomena comprising an electromagnet having two opposed pole faces and an energising coil, means to generate a variable voltage and apply said voltage to said energising coil, a sample of the material which exhibits the phenomena to be studied, an integrating circuit comprising an amplifier having an output terminal, an input terminal and a terminal common to the input and the output, the output terminal and the common terminal of said amplifier forming the output terminals of the integrating circuit, a capacitor electrically connected between the input terminal and the output terminal of the amplifier, a first resistor electrically connected at one end to the input terminal of the amplifier and an input terminal for the integrating circuit electrically connected to the other end of said resistor, a first coil winding for location in the magnetic field, a first end of said coil winding being electrically connected to the common terminal of the amplifier, switch means operable to electrically connect the input terminal of the integrating circuit to the common terminal of the amplifier in a first position and to the second end of said first coil winding in a second position, detecting means arranged to detect and indicate when the field strength of the magnetic field reaches a predetermined value, means responsive to the indication from said detecting means to change said switch means from its first position to its second position, a second coil winding arranged to surround the sample of material to be studied, magnetic resonance detecting means electrically connected to said second coil winding and recording means electrically connected to said magnetic resonance detecting means and to the output and common terminals of said integrating circuit arranged to record the output of said integrating circuit and to indicate the instant at which said resonance detector detects resonance in said sample.

6. Apparatus as claimed in claim 5 in which said detecting means comprises nuclear resonance means.

7. Apparatus as claimed in claim 5 in which said detecting means comprises electron spin resonance means.

8. Apparatus according to claim 5 which comprises a relay having first and second switch contacts forming said first and second switch means, a trigger circuit responsive to the indication from said field strength detecting means and whose output provides energising current for said relay.

9. A method of studying magnetic resonance phenomena comprising the steps of placing in a magnetic field a sample of the material to be studied, two coil windings, a first surrounding the sample, and detecting means arranged to give an indication when the magnetic field strength reaches a predetermined value, connecting said first coil winding to a resonance detector, arranging that the output from a high gain, phase reversing, D.C. amplifier having a feedback capacitor between its output and input and a series-connected input resistor is held at zero, automatically applying the voltage from said second coil winding to said amplifier input and simultaneously releasing said amplifier from being held at zero output when an indication from said detecting means is given, and simultaneously measuring the output from said amplifier and that from said resonance detector to determine the difference in field between the value at which said sample resonates and said predetermined value.

10. Apparatus for providing a visual measurement indication of the value of a changing magnetic field which comprises an integrating circuit, a coil winding for location in the changing magnetic field, signal operated switch means which are effective in a first position to hold said integrating circuit output at zero and in a second position to apply the voltage induced in said coil winding to the input of said integrating circuit, field strength detecting means for location in said magnetic field, said detecting means providing an electric signal output when said field strength is at a predetermined accurately known datum value, means for applying said output signal from said detecting means to operate said switch means from its first position to its second position at the instant when said magnetic field reaches said predetermined value and visual indicating means operated by the output of said integrating circuit to provide a visible measurement indication of the changing value of said magnetic field relative to said datum value.

11. Apparatus according to claim 10 in which said field strength detecting means comprises nuclear resonance detecting means having a detector for location in the magnetic field.

12. Apparatus according to claim 10 in which said integrating circuit comprises an amplifier, a capacitor electrically connected between the input and output of said amplifier and a resistor for discharging said capacitor, said switch means being operable in said first position to connect said resistor in parallel with said capacitor and in said second position to disconnect it therefrom.

13. Apparatus in accordance with claim 10 in which said switch means comprises a relay having an operating coil and controlled contacts which are in said first position when the relay is in the released condition, a trigger circuit, means for applying said signal from said detecting means to operate said trigger circuit and means for applying output current from said trigger circuit when operated as energising current to operate said relay.

References Cited by the Examiner
UNITED STATES PATENTS 2,916,690  12/1959  Leete _____ 324—0.5
3,034,040   5/1962  Williams _____ 324—0.5

OTHER REFERENCES

Review of Scientific Instruments, vol. 24, No. 9, Sept., 1953, the following portions: (1) Green et al., pages 743 to 749, (2) Blewett and Blewett et al., pages 779 to 788.

Horsfield et al.: Journal of Scientific Instruments, vol. 38, No. 8, Aug., 1961, pages 322–324 incl.

CHESTER L. JUSTUS, *Primary Examiner.*

MAYNARD R. WILBUR, *Examiner.*